United States Patent [19]

Kubinski

[11] 4,170,509
[45] Oct. 9, 1979

[54] TIRE BUILDING APPARATUS

[75] Inventor: Donald C. Kubinski, Wadsworth, Ohio

[73] Assignee: The Goodyear Tire & Rubber Company, Akron, Ohio

[21] Appl. No.: 894,796

[22] Filed: Apr. 10, 1978

[51] Int. Cl.² .......................................... B29H 17/20
[52] U.S. Cl. .................... 156/405 R; 83/659; 156/421; 156/457; 156/523; 226/152
[58] Field of Search ............. 156/405, 414, 406, 421, 156/407, 457, 510, 523, 525; 226/152-157; 83/659, 563, 564; 29/124, 125, 129

[56] References Cited

U.S. PATENT DOCUMENTS

| | | | |
|---|---|---|---|
| 2,218,817 | 10/1940 | Frost | 83/659 |
| 2,600,291 | 6/1952 | Engler | 29/125 |
| 3,026,230 | 3/1962 | Nebout | 156/405 |
| 3,407,106 | 10/1968 | Barefoot | 156/405 |
| 3,904,471 | 9/1975 | Kubinski | 156/405 |
| 3,989,565 | 11/1976 | Appleby | 156/405 |
| 4,052,246 | 10/1977 | Albareda | 156/412 |

Primary Examiner—John E. Kittle
Attorney, Agent, or Firm—R. S. Washburn

[57] ABSTRACT

A simple compact apparatus for applying sheet material, e.g., gum liner or radial ply stock, to a tire building drum has a plurality of rings carried on flanged rolls on three shafts. The rings form a hollow cylinder in which a cylinder actuates shoes disposed respectively between adjacent rings to lift the sheet cut off by a pair of piercing blades (for ply stock) traversed oppositely each way from center or by a single blade (for gum liner stock). One flanged roll with the rings between respective pairs of flanges forms a continuous line nip with a tire building drum for transferring the sheet from the apparatus to the building drum. The foregoing abstract is not to be taken as limiting the invention of this application, and in order to understand the full nature and extent of the technical disclosure of this application, reference must be made to the accompanying drawing and the following detailed description.

9 Claims, 3 Drawing Figures

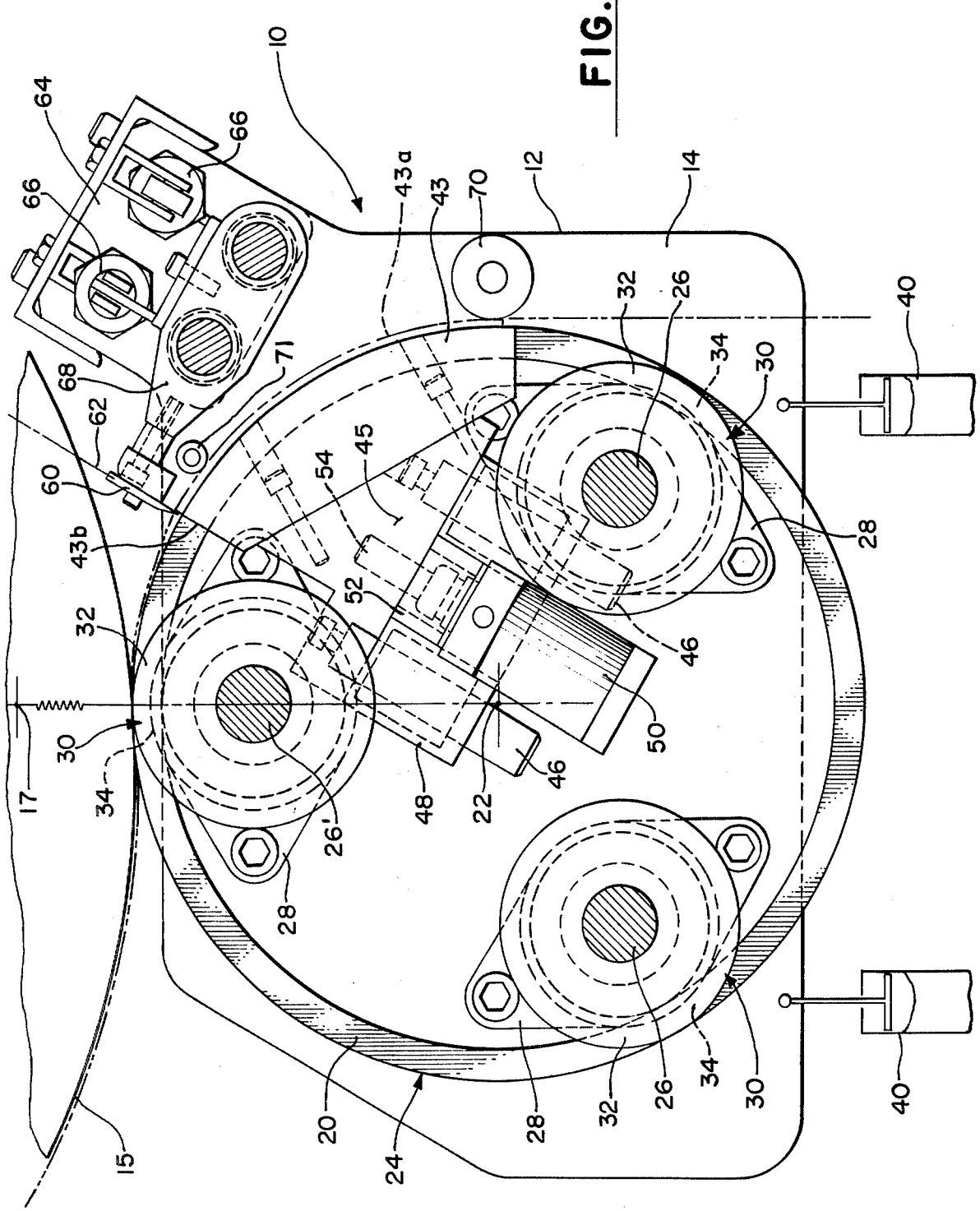

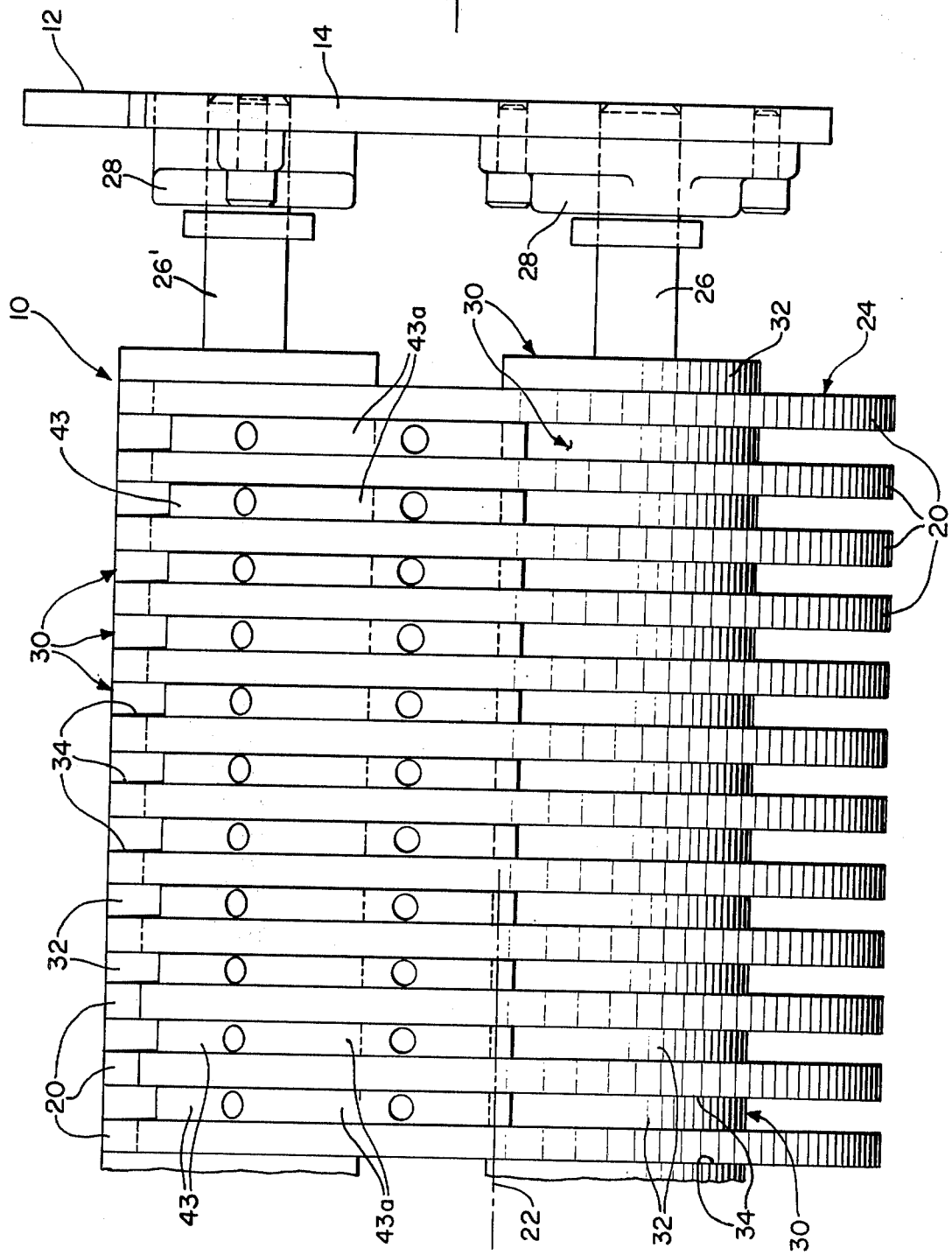

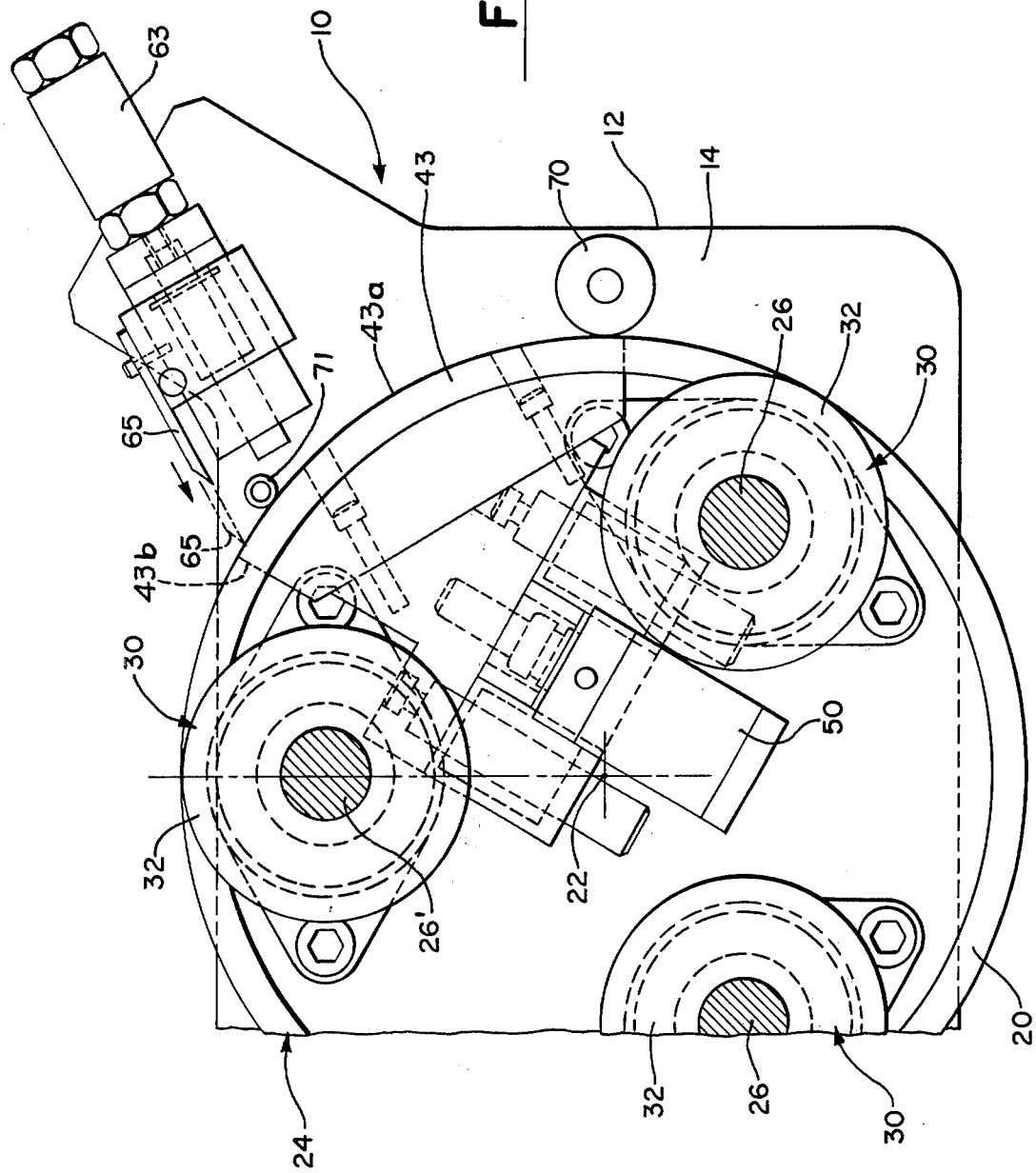

TIRE BUILDING APPARATUS

The present invention relates to tire building and particularly to means for applying tire building sheet material directly to a tire building drum.

The object of the invention is to provide improved means for transferring tire making sheet material directly to a tire building drum.

The foregoing object and others which will become apparent in the course of the following specification are achieved in accordance with the invention by an apparatus for applying a sheet of tire making material to a tire building drum having a rotation axis comprising a frame, means for transferring said sheet to said drum in response to rotation thereof including a multiplicity of identical rings arranged in parallel spaced apart planes about a common axis parallel to the axis of said drum to define a hollow cylinder on which said sheet material can be arcuately wrapped, three shafts extending parallel to and equally spaced radially of said common axis and spaced angularly thereabout, said shafts being rotatably mounted in said frame; a plurality of flanged rolls corotatably mounted respectively on said shafts, each roll having a multiplicity of pairs of annular flanges each pair thereof defining an annular groove therebetween having a cross-section commensurate with the crosssections of said rings, said rolls being disposed on said shafts such that each said groove be in coplanar alignment with the respectively associated grooves of the rolls on the other two shafts, said rings being disposed in respectively coplanarly aligned grooves and supported therein concentrically of said common axis for rotation thereabout, said flanges being disposed between respectively adjacent pairs of said rings; knife means, and lift means cooperating with said knife means for severing said sheet from a running length thereof including a plurality of shoes having spaced parallel sides spaced commensurately of said flanges and having identical arcuate radially outward surfaces the curvatures of which equal the curvature of said hollow cylinder, said shoes being disposed individually between said rings of respectively adjacent pairs thereof; a support member extending parallel to said axis inside of and through said cylinder and to which said shoes are affixed, slide means fixed in said frame and carrying said support member for movement outwardly of said common axis between a first position wherein said radially outward arcuate surfaces of said shoes are disposed flush with to slightly inward of the radially outward surfaces of said rings and a second position wherein said arcuate surfaces of said shoes are disposed radially outward of the radially outward surfaces of said rings to raise said sheet outwardly of said hollow cylinder; and means for moving said frame away from and toward said building drum to position said rings in sheet transfer relation to apply said sheet to said drum.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

In the drawings:

FIG. 1 is an end elevation view partially in section of an apparatus in accordance with the invention;

FIG. 2 is a partial side elevation view illustrating features of the apparatus of FIG. 1; and FIG. 3 is a partial view of a further embodiment of the invention.

Referring to the drawing and particularly to FIG. 1, an apparatus according to the invention is shown in operative contact with a tire building drum. The apparatus 10 includes a frame 12 having two spaced apart parallel side members 14 assembled in rigid spaced apart relation by struts (not shown) extending therebetween.

Means for transferring a sheet of tire making material to the drum 15 in response to the rotation of the drum about its own rotation axis 17 include a plurality of identical rings 20 each having a quadrilateral cross-section (FIG. 2). The rings are arranged in parallel spaced apart planes and about a common axis 22 parallel to the axis 17 of the tire building drum so as to define a hollow cylinder 24 on which the sheet material can be arcuately wrapped, over an angle of about 90 degrees as seen in FIG. 1.

To support the rings in their cylindrical arrangement, three shafts 26 extend between the side members of the frame 12 parallel to and equally spaced radially outward of the common axis 22 and at equal angles thereabout. Each of the three shafts is supported rotatably in a pair of bearing housings 28 attached respectively to the side members of the frame. One of the shafts 26' is preferably located in the plane defined by the axes 15 and 22. The flanges 32 of the roll on the shaft 26' cooperate with the rings 20 so as to form a continuous line contact with the drum 15, or with material wrapped on the drum, thereby forming a sheet transfer nip.

A plurality of flanged rolls 30 are corotatably mounted respectively on the shafts. Each flanged roll provides a multiplicity of pairs of annular flanges 32, each pair of which defines an annular groove 34 having a quadrilateral cross-section commensurate with the cross-sections of the rings 20. The rolls are disposed on the shafts 26 such that each groove 34 is aligned in coplanar relation with the corresponding grooves of the rolls 30 on the other two shafts. The respective flanged rolls support the rings 20 concentrically of the common axis 22 and maintain the respective rings in their coplanar relation so that the rings can be driven in rotation about the axis 22 in response to rotation of the tire building drum 15 about its rotation axis 17.

In order to move the frame 12 and the plurality of rings 20 carried on the frame, means for moving the frame toward and away from the building drum are provided by suitable moving means, represented in FIG. 1 by the fluid power cylinders 40, which are connected to raise and lower The frame 12 relative to the tire building drum 15.

To lift the sheet from the surface of the cylinder 24 to facilitate cutting the sheet to an appropriate length, lift means are provided including a plurality of shoes 43, a support member 45, and actuating means for moving the support member. The respective shoes 43 have parallel sides spaced commensurately of the flanges so as to occupy, with suitable clearance, the spaces between the respectively adjacent pairs of rings 20. The shoes extend arcuately over a portion, approximately 60 degrees, of the arc wrapped by the sheet. The respective shoes are affixed rigidly to the support member 45 which extends inside of and through the cylinder 24. The respective ends of the support member each have a pair of guide pins 46 which are slidably accommodated in fixtures 48 secured on the respective side members of the frame 12. Actuating means for moving the support member and the shoes attached thereto is provided by a fluid power cylinder 50, affixed to a cross member 52 extending to and between the respective side plates of the frame, the piston rod 54 of which is secured to the support member 45 so that extension of the piston rod outward from the cylinder elevates the shoes 43 with respect to the surface of the cylinder 24. This movement is made in a direction parallel to a plane containing the common axis 22 of the cylinder 24 from a first position (FIG. 1) wherein the radially outward arcuate surfaces 43a of the shoes are disposed flush with or slightly inward of the radially outward surfaces of the rings and to a second positon (chain-dotted lines) wherein the arcuate surfaces 43a of the shoes are disposed radially outward of the radially outward surfaces of the rings so as to raise the sheet being applied to a position outward of the cylinder.

To sever the sheet being applied from the running length thereof delivered to the cylinder 24, the apparatus 10 includes knife means comprising a pair of piercing blades 60 which are respectively movable, in a plane 62 containing the axis 22, oppositely, normal to the plane of FIG. 1, and parallel to the axis 22. The end faces 43b of the shoes terminate in a common plane closely parallel to the plane 62 of said knife blades so that the shoes and the knife means are cooperable when the shoes are moved to their second or outward position to sever said sheet material close to the sheet transfer nip formed between the cylinder 24 and the drum 15. When the sheet material being applied to the drum is conventional cord reinforced radial tire ply stock, the pair of piercing blades 60 are caused to enter the ply stock betweem adjacent cords of a pair by the movement of the shoes. While the ply stock is so held outward of the cylindrical surface of the rings, the respective piercing blades are traversed equally and oppositely parallel to the axis by the respective cylinders 66 each attached to one of the carriers 68 on which the piercing blades are respectively mounted.

When the sheet material being applied to the tire building drum is of uncured gum rubber free of cord or other filament reinforcing, the severing is carried on by a single knife blade. The single blade 65 is located relative to the shoe end faces 43b so that the blade engages the surfaces 43a and the outer surfaces of the rings 20 before the shoes 43 lift the sheet from the cylinder 25. The softer gum sheet is thus cut simultaneously along a single continuous line. The actuator 63 moves the blade away from and to the cylinder 24 to cut the sheet along a line spaced from the transfer nip relatively further than the space from the nip to the faces 43b. After the gum sheet is severed, the blade is moved away and the shoes lift the sheet from the rings as before. In this option, FIG. 3, the knife traversing mechanism 64 is not required and can be replaced by a simple actuator 63 for the single blade.

The operation of the knife means and of the actuating means to raise the shoes outward of the cylindrical surface of the rings can readily be connected to means for counting increments of rotation of the tire building drum so that an exact length corresponding to the circumference of the drum at the radius to which the tire sheet material is applied can be cut off.

In order to maintain contact between the sheet of tire making material and the radially outward surfaces 43a of the shoes and/or of the rings, a simple anti-backup means can be provided. In FIG. 1, the anti-backup means is represented by a roller 70 having conventional one-way clutch.

The shaft carrying the roller 70 and the clutch is mounted on brackets which are attached respectively to the axially outer ends of the support member 45 and, preferably, is lightly spring-biased toward the surfaces 43a. A smaller roller 71, constructed and arranged similarly to the roller 70 can be used close to the blades 60 and 65 so as to inhibit the displacement of the sheet by the blade or blades. The roller or rollers bear against the arcuate surface of the shoes and/or of the rings to prevent retrograde movement of the sheet material being applied, particularly when the sheet material has been severed by the knife means. The arrangement allows the roller to maintain its contact with the sheet material on the shoes as the same move from their inward to outward positions.

As has been mentioned, the rings are caused to rotate in response to the rotation of the tire building drum, thus require no external drive means. The apparatus is simple, compact, and effective.

While certain representative embodiments and details have been shown for the purpose of illustrating the invention, it will be apparent to those skilled in the art that various changes and modifications may be made therein without departing from the spirit or scope of the invention.

What is claimed is:

1. An apparatus for applying a sheet of tire making material to a tire building drum having a rotation axis comprising, a frame,
   means for transferring said sheet to said drum in response to rotation thereof including a multiplicity of identical rings arranged in parallel spaced apart planes about a common axis parallel to the axis of said drum to define a hollow cylinder on which said sheet material can be arcuately wrapped;
   three shafts extending parallel to and equally spaced radially of said common axis and spaced angularly thereabout, said shafts being rotatably mounted in said frame;
   a plurality of flanged rolls corotatably mounted respectively on said shafts, each roll having a multiplicity of pairs of annular flanges each pair thereof defining an annular groove therebetween having a cross-section commensurate with the cross-sections of said rings, said rolls being disposed on said shafts such that each said groove be in coplanar alignment with the respectively associated grooves of the rolls on the other two shafts, said rings being disposed in respectively coplanarly aligned grooves and supported therein concentrically of said common axis for rotation thereabout, said flanges being disposed between respectively adjacent pairs of said rings;
   knife means, and lift means cooperating with said knife means for severing said sheet from a running length thereof including a plurality of shoes having spaced parallel sides spaced commensurately of said flanges and having identical arcuate radially outward surfaces the curvatures of which equal the curvature of said hollow cylinder, said shoes being disposed individually between said rings of respectively adjacent pairs thereof;
   a support member extending parallel to said axis inside of and through said cylinder and to which said shoes are affixed, slide means fixed in said frame and carrying said support member for movement outwardly of said common axis between a first position wherein said radially outward arcuate surfaces of said shoes are disposed flush with to inward of the radially outward surfaces of said rings and a second position wherein said arcuate surfaces of said shoes are disposed radially outward of the radially outward surfaces of said rings to raise said sheet outwardly of said hollow cylinder; and means for moving said frame away from and toward said building drum to position said rings in sheet transfer relation to apply said sheet to said drum.

2. Apparatus as claimed in claim 1, said knife means being disposed in a plane containing said common axis, said shoes having end faces disposed closely parallel to said common plane, said knife means being cooperable with said end faces, when said shoes are moved to their said second position, to cut said sheet material parallel to said rotation axis of the drum.

3. Apparatus as claimed in claim 1, further comprising anti-backup means including a roller mounted in said frame to extend parallel to said rotation axis adjacent said shoes for maintaining contact between said sheet of tire making material and said shoes, and means for moving said roll toward and away from said axis to accommodate the movement of said shoes.

4. Apparatus as claimed in claim 2, wherein said knife means comprises a single blade movable toward and away from said cylinder.

5. Apparatus as claimed in claim 2, wherein said knife means comprises a pair of piercing blades respectively movable oppositely parallel said axis.

6. An apparatus for applying a sheet of tire making material to a tire building drum, the apparatus comprising ring means cooperating with said drum to provide a transfer nip, said ring means comprising a multiplicity of rings arranged in spaced parallel planes and about a common axis parallel to said drum and defining a cylindrical surface and roll means having multiple flanges respectively disposed between adjacent pairs of said rings, said roll means being mounted for rotation about shaft means disposed parallel to and between said axis and said rings, and severing means disposed in predetermined spaced relation to said nip operable to sever said sheet from a running length supply thereof.

7. An apparatus as claimed in claim 6, further comprising sheet lift means for lifting said sheet radially from contact with said rings, said lift means including a plurality of arcuate shoes terminating at end faces spaced arcuately from said nip and disposed individually between respectively adjacent pairs of said rings and means mounted in said cylinder for moving said shoes outwardly of said cylindrical surface, and knife means operable to sever a sheet being carried on said cylindrical surface along a cutting line adjacent said end faces.

8. Apparatus as claimed in claim 7, wherein said knife means comprises a single blade movable toward and away from said cylinder.

9. Apparatus as claimed in claim 7, wherein said knife means comprises a pair of piercing blades respectively movable oppositely parallel said axis.

* * * * *